United States Patent
Zha

(10) Patent No.: US 11,866,626 B2
(45) Date of Patent: Jan. 9, 2024

(54) COLOR CONVERSION FILM MATERIAL, COLOR CONVERSION FILM, AND DISPLAY DEVICE

(71) Applicant: TCL CHINA STAR OPTOELECTRONICS TECHNOLOGY CO., LTD., Shenzhen (CN)

(72) Inventor: Bao Zha, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 653 days.

(21) Appl. No.: 17/055,543

(22) PCT Filed: Aug. 4, 2020

(86) PCT No.: PCT/CN2020/106700
§ 371 (c)(1),
(2) Date: Nov. 13, 2020

(87) PCT Pub. No.: WO2022/000693
PCT Pub. Date: Jan. 6, 2022

(65) Prior Publication Data
US 2022/0220371 A1   Jul. 14, 2022

(30) Foreign Application Priority Data

Jul. 2, 2020  (CN) .......................... 202010627149.8

(51) Int. Cl.
*C09K 11/06* (2006.01)
*G02F 1/1335* (2006.01)
(Continued)

(52) U.S. Cl.
CPC ................. *C09K 11/06* (2013.01); *C08J 5/18* (2013.01); *C08K 5/3437* (2013.01); *C08K 5/55* (2013.01);
(Continued)

(58) Field of Classification Search
None
See application file for complete search history.

(56) References Cited

U.S. PATENT DOCUMENTS

2016/0223728 A1*  8/2016  Shin ..................... G02B 6/0073
2019/0367735 A1   12/2019  Lukhtanov

FOREIGN PATENT DOCUMENTS

CN      105739167 A    7/2016
CN      106154620 A   11/2016
(Continued)

*Primary Examiner* — Gregory D Clark
(74) *Attorney, Agent, or Firm* — PV IP PC; Wei Te Chung; Zhigang Ma

(57) ABSTRACT

A color conversion film material, a color conversion film, and a display device are provided. The material of the color conversion film includes a first compound and a second compound, and a mass ratio of the first compound and the second compound is (0.4-1.6):(0.3-1.7). A heat stability of the color conversion film is enhanced by using the color conversion film made of the material of the color conversion film. Moreover, a color gamut of the display device is improved, and costs thereof are reduced by applying the color conversion film to the display device.

18 Claims, 2 Drawing Sheets

(51) Int. Cl.
*C08J 5/18* (2006.01)
*C08K 5/3437* (2006.01)
*C08K 5/55* (2006.01)
*C09K 11/02* (2006.01)
*F21V 8/00* (2006.01)
*G02F 1/1333* (2006.01)

(52) U.S. Cl.
CPC .......... *C09K 11/025* (2013.01); *G02B 6/0055* (2013.01); *G02B 6/0056* (2013.01); *G02F 1/133382* (2013.01); *G02F 1/133614* (2021.01); *C08J 2333/04* (2013.01); *C09K 2211/1007* (2013.01); *C09K 2211/1018* (2013.01); *G02B 6/0026* (2013.01)

(56) References Cited

FOREIGN PATENT DOCUMENTS

| | | | | |
|---|---|---|---|---|
| CN | 109073933 | A | 12/2018 | |
| CN | 109768181 | A | 5/2019 | |
| CN | 110808322 | A | 2/2020 | |
| CN | 111077698 | * | 4/2020 | ......... G02F 1/13357 |
| CN | 111077698 | A | 4/2020 | |
| TW | 202000864 | A | 1/2020 | |
| WO | 2016129298 | A1 | 8/2016 | |
| WO | 2019243288 | A1 | 12/2019 | |

\* cited by examiner

COLOR CONVERSION FILM MATERIAL, COLOR CONVERSION FILM, AND DISPLAY DEVICE

This application is a Notional Phase of PCT Patent Application No. PCT/CN2020/106700 having international filing date of Aug. 4, 2020, which claims priority to Chinese Patent Application No. 202010627149.8 filed on Jul. 2, 2020, the entire contents of which are incorporated by reference in this application.

FIELD OF INVENTION

The present disclosure relates to the field of display technology, and specifically, to a color conversion film material, a color conversion film, and a display device.

BACKGROUND OF INVENTION

Currently, backlights of liquid crystal displays generally employ common yellow phosphor backlights, thus causing a low color gamut of liquid crystal displays. Additionally, three primary color filters currently in use have overlapping areas, and for example, red light and green light include an overlapping area of yellow-orange light wave band ranging from 560 to 610 nm; blue light and green light include an overlapping area of cyan light wave band ranging from 480 to 510 nm wave. As a result, a purity of the RGB three primary colors is low, and the color gamut of the displays may not be improved.

SUMMARY OF INVENTION

Technical Problem

The present disclosure provides a color conversion film material, a color conversion film, and a display device to enhance heat stability of the color conversion film, improve a color gamut of the display device, and reduce costs of the display device.

Technical Solutions

The present disclosure provides a material of the color conversion film, and the material of the color conversion film includes a first compound and a second compound, wherein a structural formula of the first compound is

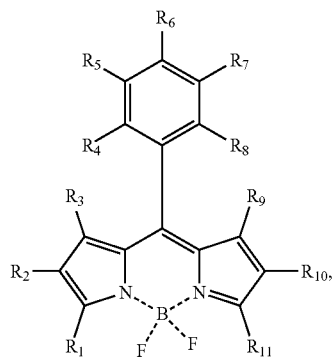

wherein $R_1$, $R_2$, $R_3$, $R_4$, $R_5$, $R_6$, $R_7$, $R_8$, $R_9$, $R_{10}$, and $R_{11}$ are respectively and independently selected from one of a halogen atom, —CN, a tert-butyl group, a non-conjugated structure, and a conjugated structure formed by connecting an alkoxy group with an ester group;

wherein a structural formula of the second compound is

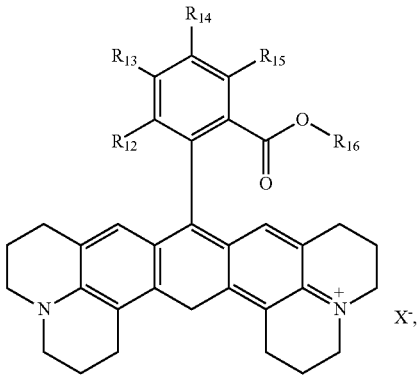

wherein $R_{12}$, $R_{13}$, $R_{14}$, and $R_{15}$ are one of —F, —Cl, Br, —I, —NH$_2$, —COOH, —OH, —SH, —COH, —COO—, —COCl, —COBr, —CN, —NO$_2$, —NH$_2$, =NH, ≡N, a benzene, a phenol ring, an non-conjugated structure, and a conjugated structure formed by connecting an alkoxy group with an ester group, $R_{16}$ is an non-conjugated structure, and $X^-$ is one of $F^-$, $Cl^-$, $Br$, $CN^-$, $ClO_4^-$, $CF_3SO_3^-$, $CF_2HSO_3^-$, and $CFH_2SO_3^-$; and wherein a mass ratio of the first compound and the second compound is (0.4-1.6):(0.3-1.7).

In the material of the color conversion film provided by the present disclosure, the material of the color conversion film further includes a dispersion system, the first compound and the second compound are dispersed in the dispersion system, the dispersion system is a pressure sensitive adhesive, and a mass ratio of the first compound, the second compound, and the dispersion system is (0.4-1.6):(0.3-1.7):(100-1000).

In the material of the color conversion film provided by the present disclosure, the material of the color conversion film further includes a dispersion system, the first compound and the second compound are dispersed in the dispersion system, the dispersion system includes an acrylic resin, an acrylic monomer, and a photoinitiator, and a mass ratio of the first compound, the second compound, the acrylic resin, the acrylic monomer, and the photoinitiator is (0.4-1.6):(0.3-1.7):(24-300):(74-500):(2-200).

In the material of the color conversion film provided by the present disclosure, the non-conjugated structure is selected from one of an ester group containing a chain structure, —C$_n$H$_{2n+1}$, —OC$_y$H$_{2y+1}$, and —FC$_m$H$_{2m}$, and n=1-40, y=1-40, and m=1-40.

In the material of the color conversion film provided by the present disclosure, the conjugated structure formed by the connection of the alkoxy group and the ester group further includes a heterocyclic group, and the heterocyclic group includes one of a five-membered heterocyclic group, a six-membered heterocyclic group, and a benzoheterocyclic group.

In the material of the color conversion film provided by the present disclosure, the five-membered heterocyclic group includes one of furan, thiophene, pyrrole, imidazole, and thiazole.

In the material of the color conversion film provided by the present disclosure, the six-membered heterocyclic group includes one of pyridine, pyrazine, pyrimidine, and pyridazine.

In the material of the color conversion film provided by the present disclosure, the benzoheterocyclic group includes one of indole, quinoline, pteridine, and acridine.

The present disclosure further provides a color conversion film, and the color conversion film includes the above-mentioned material of the color conversion film.

The present disclosure further provides a display device, and the display device includes:

an optical structure including a color conversion film;

wherein a material of the color conversion film includes a first compound and a second compound;

wherein a structural formula of the first compound is

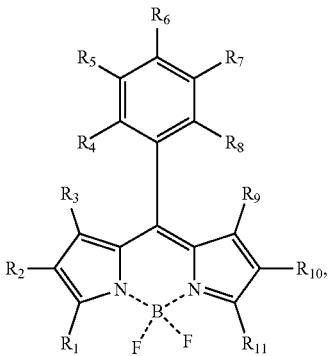

wherein $R_1$, $R_2$, $R_3$, $R_4$, $R_5$, $R_6$, $R_7$, $R_8$, $R_9$, $R_{10}$, and $R_{11}$ are respectively and independently selected from one of a halogen atom, —CN, a tert-butyl group, an non-conjugated structure, and a conjugated structure formed by connecting an alkoxy group with an ester group;

wherein a structural formula of the second compound is

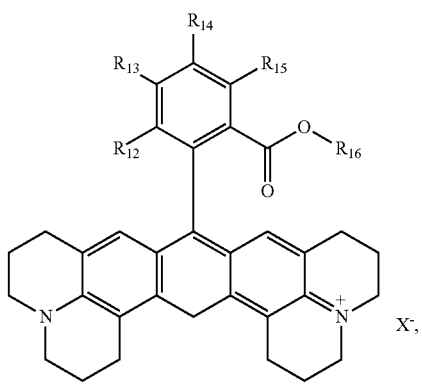

wherein $R_{12}$, $R_{13}$, $R_{14}$, and $R_{15}$ are one of —F, —Cl, Br, —I, —NH$_2$, —COOH, —OH, —SH, —COH, —COO—, —COCl, —COBr, —CN, —NO$_2$, —NH$_2$, =NH, ≡N, a benzene, a phenol ring, an non-conjugated structure, and a conjugated structure formed by connecting an alkoxy group with an ester group, $R_{16}$ is a non-conjugated structure, and $X^-$ is one of $F^-$, $Cl^-$, $Br$, $CN^-$, $ClO_4^-$, $CF_3SO_3^-$, $CF_2HSO_3^-$, and $CFH_2SO_3$; and wherein a mass ratio of the first compound and the second compound is (0.4-1.6):(0.3-1.7).

In the display device provided by the present disclosure, the display device further includes a backlight source and a back plate;

wherein the backlight source is disposed near a lateral side of the optical structure, and the back plate is disposed under a bottom of the optical structure; wherein the optical structure is a light guiding plate, and the color conversion film is disposed at a side of the light guiding plate close to the backlight source; and wherein the light guiding plate further includes a reflective layer, the reflective layer is disposed at a lower surface of the light guiding plate close to the back plate, and the reflective layer includes a plurality of reflective portions.

In the display device provided by the present disclosure, the display device further includes a backlight source and a back plate;

wherein the backlight source is disposed near a lateral side of the optical structure, and the back plate is disposed under a bottom of the optical structure;

wherein the optical structure is a light guiding plate, and the color conversion film is disposed at a lower surface of the light guiding plate close to the back plate; and wherein the light guiding plate further includes a reflective layer, the reflective layer is disposed at a lower surface of the color conversion film close to the back plate, and the reflective layer includes a plurality of reflective portions.

In the display device provided by the present disclosure, the optical structure is a polarizer, and the color conversion film is disposed in the polarizer.

In the display device provided by the present disclosure, the display device further includes a heat dissipation plate, and the heat dissipation plate is disposed at a side of the backlight source away from the optical structure.

In the display device provided by the present disclosure, the display device further includes a light transmitting layer, and the light transmitting layer is disposed at a side of the color conversion film away from the light guiding plate.

In the display device provided by the present disclosure, the display device further includes a baffle, and the baffle is located under a lower surface of the reflective layer close to the back plate.

In the display device provided by the present disclosure, the display device further includes a barrier layer, and the barrier layer is located near a side of the backlight source away from the baffle.

In the display device provided by the present disclosure, the polarizer includes a peeling protection film and a surface protection film, and the color conversion film is disposed between the peeling protection film and the surface protection film.

Advantageous Effects

The present disclosure provides a color conversion film material, a color conversion film, and a display device. The material of the color conversion film includes the first compound and the second compound, and the mass ratio of the first compound and the second compound is (0.4-1.6):(0.3-1.7). The color conversion film has high heat stability by using the color conversion film made of the material of the color conversion film. Moreover, a color gamut of the display device is improved, and costs thereof are reduced by applying the color conversion film to the display device.

DESCRIPTION OF DRAWINGS

In order to clearly illustrate technical solutions in the present disclosure, the drawings required for using in the description of the embodiments is briefly described below. Obviously, the drawings in the following description are only some of the embodiments of the present disclosure. For those skilled in the art, other drawings may also be obtained in accordance with these drawings without making for creative efforts.

DETAILED DESCRIPTION OF PREFERRED EMBODIMENTS

Figure 1:
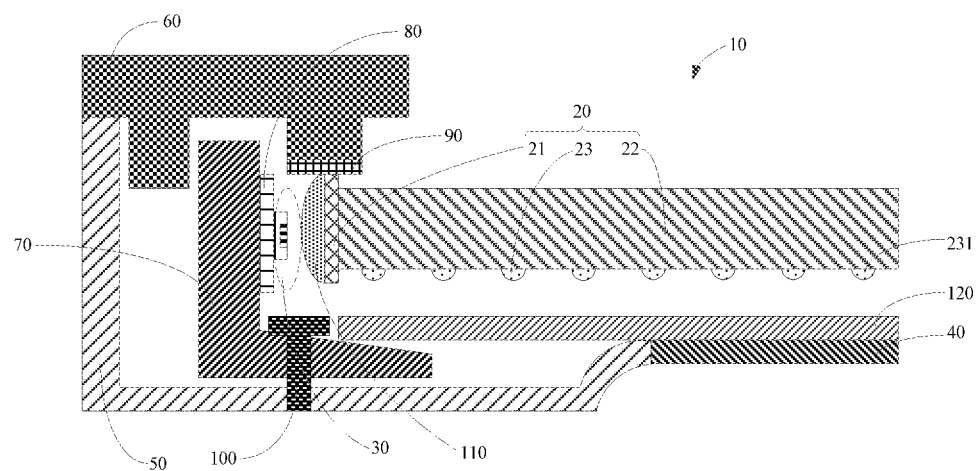
FIG. 1 is a sectional view of a first structure of a display device provided by the present disclosure.

In combination with accompanying drawings in embodiments of the present disclosure below, technical solutions in the embodiments of the present disclosure are clearly and completely described. Obviously, the described embodiments are merely a part of the embodiments of the present disclosure, rather than all the embodiments. Based on the embodiments in the present disclosure, all of other embodiments obtained by those skilled in the art without making for creative efforts belong to the scope protected by the present disclosure.

The present disclosure provides a material of a color conversion film. The material of the color conversion film includes a first compound and a second compound. A structural formula of the first compound is

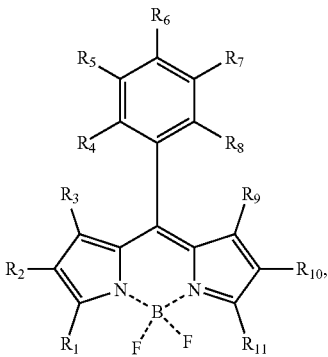

wherein $R_1$, $R_2$, $R_3$, $R_4$, $R_5$, $R_6$, $R_7$, $R_8$, $R_9$, $R_{10}$, and $R_{11}$ are respectively and independently selected from one of a halogen atom, —CN, a tert-butyl group, a non-conjugated structure, and a conjugated structure formed by connecting an alkoxy group with an ester group. A structural formula of the second compound is

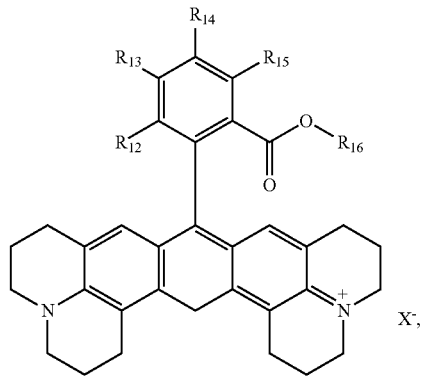

wherein $R_{12}$, $R_{13}$, $R_{14}$, and $R_{15}$ are one of —F, —Cl, Br, —I, —NH$_2$, —COOH, —OH, —SH, —COH, —COO—, —COCl, —COBr, —CN, —NO$_2$, —NH$_2$, =NH, ≡N, a benzene, a phenol ring, an non-conjugated structure, and a conjugated structure formed by connecting an alkoxy group with an ester group, and $R_{10}$ is an non-conjugated structure. Specifically, the non-conjugated structure is selected from one of an ester group containing a chain structure, —C$_n$H$_{2n+1}$, —OC$_y$H$_{2y+1}$, and —FC$_m$H$_{2m}$, and n=1-40, y=1-40, and m=1-40. In an embodiment, the conjugated structure formed by the connection of the alkoxy group and the ester group further includes a heterocyclic group, and the heterocyclic group includes one of a five-membered heterocyclic group, a six-membered heterocyclic group, and a benzoheterocyclic group. The five-membered heterocyclic group includes one of furan, thiophene, pyrrole, imidazole, thiazole, and the like. The six-membered heterocyclic group includes one of pyridine, pyrazine, pyrimidine, pyridazine, and the like. The benzoheterocyclic group includes one of indole, quinoline, pteridine, and acridine. X$^-$ is one of F$^-$, Cl$^-$, Br, CN$^-$, ClO$_4^-$, CF$_3$SO$_3^-$, CF$_2$HSO$_3^-$, and CFH$_2$SO$_3^-$. A mass ratio of the first compound and the second compound is (0.4-1.6):(0.3-1.7). Specifically, the mass ratio of the first compound and the second compound may be one of 0.5:0.6, 0.7:0.9, 1:1, 1:1.2, or 1.4:1.6.

In an embodiment, the $R_1$ is —Br, the $R_2$ is —CN, the $R_3$ is —C$_2$H$_5$, the $R_4$ is —FC$_3$H$_6$, the $R_5$ is —I, the $R_6$ is —Cl, the $R_7$ is —OC$_3$H$_7$, as well as the $R_8$, the $R_9$, the $R_{10}$, and the $R_{11}$ are the tert-butyl group. The structural formula of the first compound may be

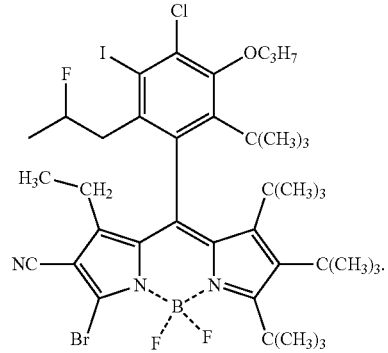

The $R_{12}$ is —COOH, the $R_{13}$ is —COH, the $R_{14}$ is —COH, the $R_{15}$ is the benzene, and the $R_{16}$ is —C$_n$H$_{2n+1}$, in which when n=1, the $R_{16}$ is —CH$_3$. The X$^-$ is CF$_3$SO$_3^-$. The structural formula of the second compound may be

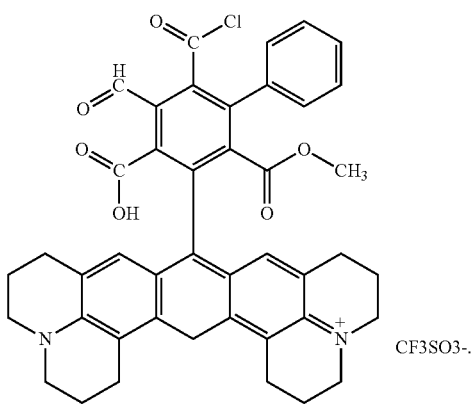

In an embodiment, the $R_1$ is the five-membered heterocyclic group formed by connecting the alkoxy group with the ester group, for example, thiophene formed by connecting the alkoxy group with the ester group. The $R_2$ is —CN, the $R_3$ is —$C_2H_5$, the $R_a$ is —$FC_3H_6$, the $R_5$ is —I, the $R_6$ is —Cl, the $R_7$ is —$OC_3H_7$, as well as the $R_8$, the $R_9$, the $R_{10}$, and the $R_{11}$ are the tert-butyl group. The structural formula of the first compound may be

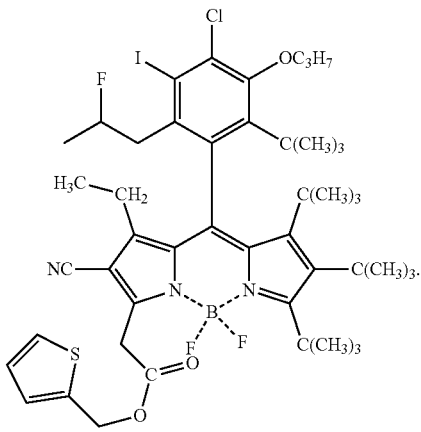

The $R_{12}$ is —COOH, the $R_{13}$ is —SH, the $R_{14}$ is the phenol ring, the $R_{15}$ is the benzene, and the $R_{16}$ is —$OC_yH_{2y+1}$, in which when y=2, the $R_{16}$ is —$OC_2H_5$. The $X^-$ is $ClO_4^-$. The structural formula of the second compound may be

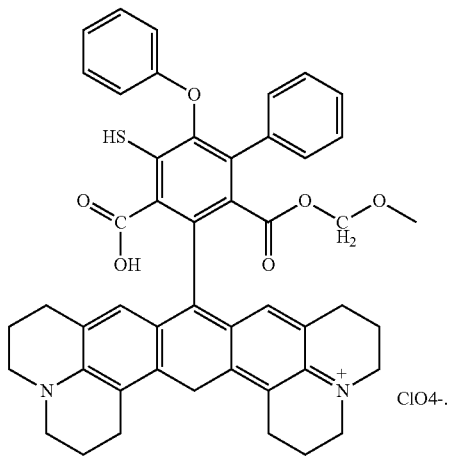

In an embodiment, the $R_1$ is the conjugated structure formed by connecting the alkoxy group with the ester group, for example,

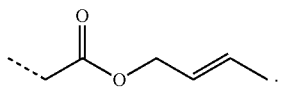

The $R_2$ is —CN, the $R_3$ is —$C_2H_5$, the $R_4$ is —$FC_3H_6$, the $R_5$ is —I, the $R_6$ is —Cl, the $R_7$ is —$OC_3H_7$, as well as the $R_8$, the $R_9$, the $R_{10}$, and the $R_{11}$ are the tert-butyl group. The structural formula of the first compound may be

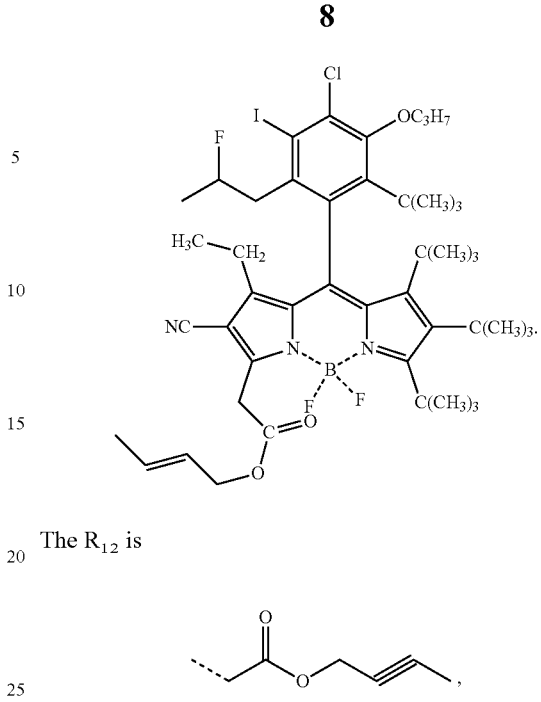

The $R_{12}$ is

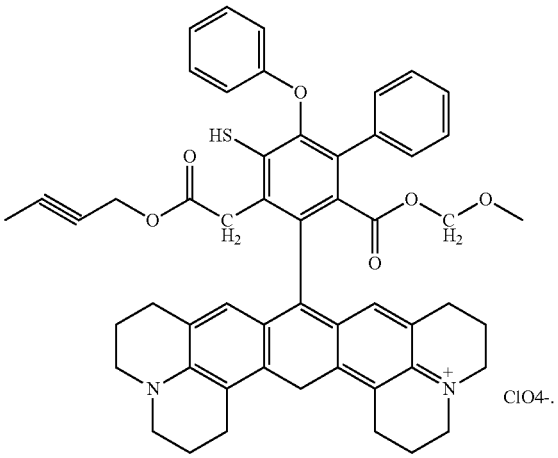

the $R_{13}$ is —SH, $R_{14}$ is the phenol ring, the $R_{15}$ is the benzene, and the $R_{16}$ is —$OC_yH_{2y+1}$, in which when y=1, the $R_{16}$ is —$OC_2H_5$. The $X^-$ is $ClO_4^-$. The structural formula of the first compound may be In another embodiment, the material of the color conversion film further includes a dispersion system. The first compound and the second compound are dispersed in the dispersion system. The dispersion system is a pressure sensitive adhesive. A mass ratio of the first compound, the second compound, and the dispersion system is (0.4-1.6):(0.3-1.7):(100-1000). Specifically, the dispersion system is the pressure sensitive adhesive. The mass ratio of the first compound, the second compound, and the dispersion system may be one of 0.5:0.6:150, 1:1:300, 1:1.2:500, or 1:1:900.

In another embodiment, the dispersion system includes an acrylic resin, an acrylic monomer, and a photoinitiator. The first compound and the second compound are dispersed in the dispersion system. A mass ratio of the first compound, the second compound, the acrylic resin, the acrylic monomer, and the photoinitiator is (0.4-1.6):(0.3-1.7):(24-300):

(74-500):(2-200). Specifically, the mass ratio of the first compound, the second compound, the acrylic resin, the acrylic monomer, and the photoinitiator may be one of 0.5:0.6:30:120:130, 1:1:80:150:160, 1:1.2:50:90:100, or 1:1:25:75:3.

In the present disclosure, the material of the color conversion film includes the first compound and the second compound. The first compound is a boron fluoride dipyrrole derivative which may absorb cyan light at 480 nm-510 nm, and then emit green light. The second compound is a rhodamine 101 derivative which may absorb yellow-orange light at 560 nm-610 nm, and then emit red light. The first compound and the second compound are mixed in the dispersion system to form the material of the color conversion film, thus improving a color gamut of the display device.

The present disclosure further provides a color conversion film. The color conversion film is made of the material of the color conversion film which includes all the above-mentioned technical features.

In the present disclosure, a color conversion film is provided. The first compound is the boron fluoride dipyrrole derivative which may absorb the cyan light at 480 nm-510 nm, and then emit the green light, and the second compound is the rhodamine 101 derivative which may absorb the yellow-orange light at 560 nm-610 nm, and then emit the red light. The first compound and the second compound are mixed in the dispersion system to form the material of the color conversion film. Since the first compound, the second compound, and the dispersion system are employed to form the color conversion film, a heat stability of the color conversion film is enhanced, costs of production are reduced, and the color gamut of the display device is improved.

Referring to FIG. 1, FIG. 1 is a sectional view of a first structure of a display device provided by the present disclosure. The present disclosure provides a display device 10, and the display device 10 includes an optical structure 20.

The optical structure 20 includes a color conversion film 21. The color conversion film includes a first compound and a second compound. A structural formula of the first compound is

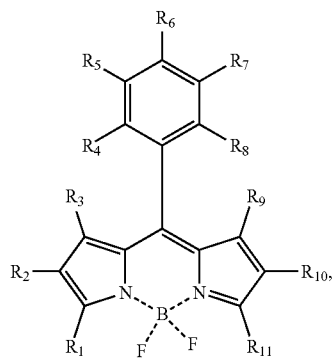

wherein $R_1$, $R_2$, $R_3$, $R_4$, $R_5$, $R_6$, $R_7$, $R_8$, $R_9$, $R_{10}$, and $R_{11}$ are respectively and independently selected from one of a halogen atom, —CN, a tert-butyl group, a non-conjugated structure, and a conjugated structure formed by connecting an alkoxy group with an ester group. A structural formula of the second compound is

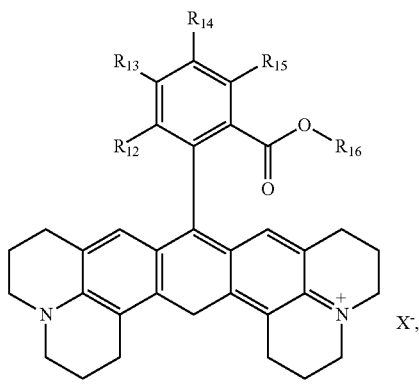

wherein $R_{12}$, $R_{13}$, $R_{14}$, and $R_{15}$ are one of —F, —Cl, Br, —I, —NH$_2$, —COOH, —OH, —SH, —COH, —COO—, —COCl, —COBr, —CN, —NO$_2$, —NH$_2$, =NH, ≡N, a benzene, a phenol ring, an non-conjugated structure, and a conjugated structure formed by connecting an alkoxy group with an ester group, $R_{16}$ is an non-conjugated structure, and X$^-$ is one of F$^-$, Cl$^-$, Br, CN$^-$, ClO$_4^-$, CF$_3$SO$_3^-$, CF$_2$HSO$_3^-$, and CFH$_2$SO$_3^-$. A mass ratio of the first compound and the second compound is (0.4-1.6):(0.3-1.7). The optical structure may be one of a light guiding plate and a polarizer.

In another embodiment, the display device 10 further includes a backlight source 30 and a back plate 40. The backlight source 30 is disposed near a lateral side of the optical structure 20. The optical structure 20 is the light guiding plate. The color conversion film 21 is disposed at a side of the light guiding plate 22 close to the backlight source 30. The back plate 40 is disposed under a bottom of the optical structure 20. The light guiding plate 22 further includes a reflective layer 23, the reflective layer 23 is disposed at a lower surface of the light guiding plate 22 close to the back plate 40. The reflective layer 23 includes a plurality of reflective portions 231, and is used to improve a uniformity of light.

In another embodiment, the display device 10 further includes an outer frame 50, a plastic frame 60, an aluminum extrusion 70, a heat dissipation plate 80, a barrier layer 90, a fixation structure 100, a light transmitting layer 110, and a baffle 120. The outer frame 50 is located near a side of the optical structure 20 close to the backlight source 30. An end of the outer frame 50 close to the backlight source 30 is connected with the plastic frame 60, thus playing a role of supporting the display device and protecting the structures in the display device from damage. Another end of the outer frame 50 away from the backlight source 30 is connected with the back plate 40. The aluminum extrusion 70 is located between the plastic frame 60 and the outer frame 50. The heat dissipation plate 80 is disposed at a surface of the aluminum extrusion 70 close to the optical structure 20. The backlight source 30 is disposed at a surface of the heat dissipation plate 80 close to the optical structure 20. The fixation structure 100 is used to fix the aluminum extrusion 70 to the outer frame 50. The barrier layer 90 is disposed at a surface of the plastic frame 60 close to the backlight source. The barrier layer 90 is used to reflect light emitted from the backlight source 30 to the barrier layer 90, and the reflected light passes through the light transmitting layer 110 and is subsequently emitted to the optical structure 20. The color conversion film 21 is disposed at a surface of the light guiding plate 22 close to the backlight source 30. When white light emitted by the backlight source 30 passes the color conversion film 21, the cyan light and the yellow-orange light in the white light are absorbed, so that the light emitted by the backlight source 30 is purified, thus improving the color gamut of the display device 10. The light transmitting layer 110 is disposed at a surface of the color conversion film 21 close to the backlight source 30. The baffle 120 is located under a lower surface of the reflective layer 23 close to the back plate 40.

In the present disclosure, when the white light emitted by the backlight source passes the color conversion film, the cyan light and the yellow-orange light in the white light are absorbed, so that the light emitted by the backlight source is purified, thus improving the color gamut of the display device.

Figure 2:
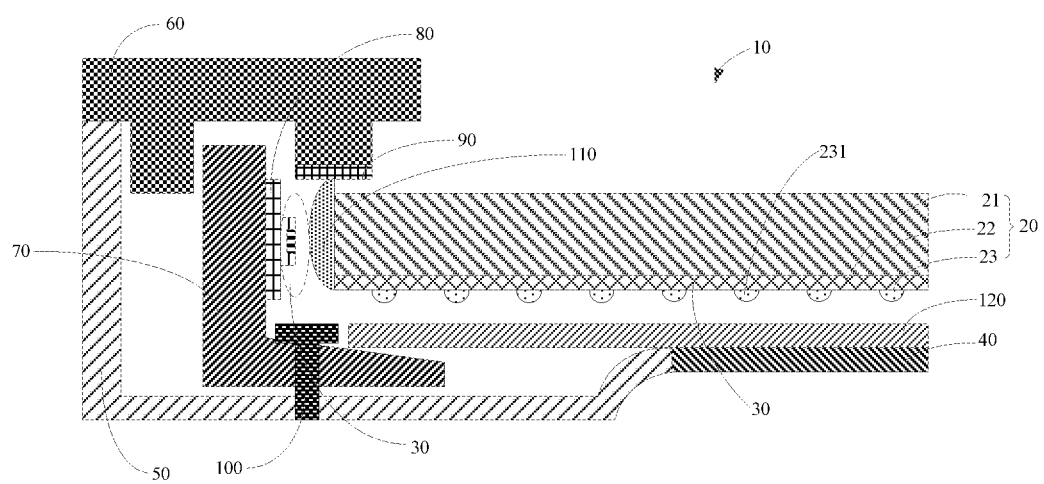
FIG. 2 is a sectional view of a second structure of the display device provided by the present disclosure.

Referring to FIG. 2, FIG. 2 is a sectional view of a second structure of the display device provided by the present disclosure. It should be noted that a difference between FIG. 2 and FIG. 1 is: the color conversion film 21 is disposed at a lower surface of the light guiding plate 22 close to the back plate 40. When the white light emitted by the backlight source passes the color conversion film, which is disposed at the lower surface of the light guiding plate 22 close to the back plate 40, as well as the reflective portions 231, the light is completely reflected in the reflective portions 231, and the cyan light and the yellow-orange light in the white light are absorbed, so that the red light and the blue light in the backlight source are purified, thus improving the color gamut of the display device.

Figure 3:
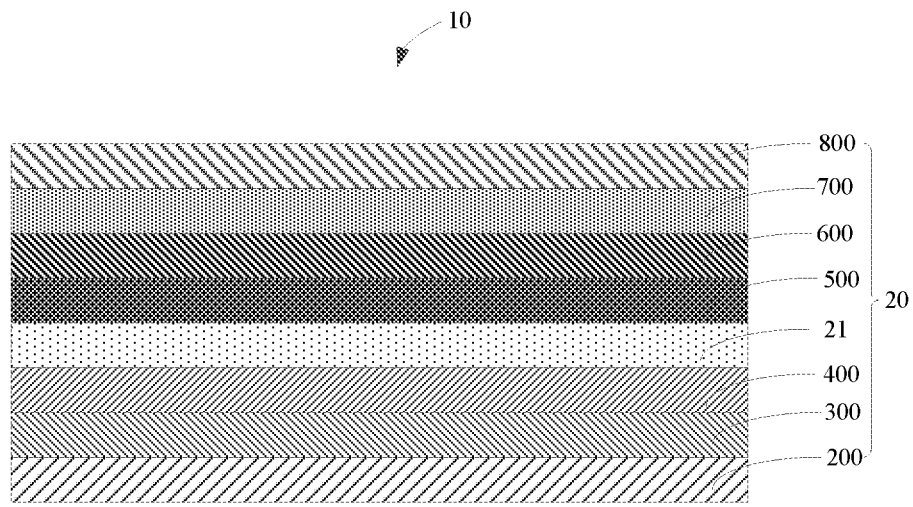
FIG. 3 is a sectional view of a third structure of the display device provided by the present disclosure.

Referring to FIG. 3, FIG. 3 is a sectional view of a third structure of the display device provided by the present disclosure. The display device 10 includes the optical structure 20. The optical structure 20 includes the color conversion film 21. The optical structure 20 is the polarizer. The polarizer 20 includes a peeling protection film 200, an adhesive layer 300, a passivation layer 400, a first protection layer 500, a polarizing sub-layer 600, a second protection layer 700, and a surface protection film 800. The adhesive layer 300, the passivation layer 400, the first protection layer 500, the polarizing sub-layer 600, the second protection layer 700, and the surface protection film 800 are stacked on the peeling protection film 200 in sequence. The color conversion film 21 is disposed between any two layers of the peeling protection film 200, the adhesive layer 300, the passivation layer 400, the first protection layer 500, the polarizing sub-layer 600, the second protection layer 700, and the surface protection film 800. Specifically, in the embodiment, the color conversion film 21 is disposed between the passivation layer 400 and the first protection layer 500.

Figure 4:
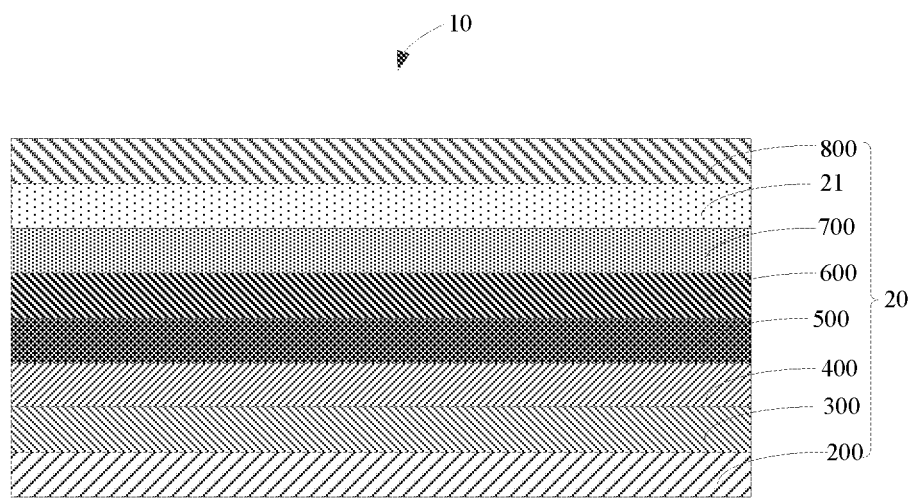
FIG. 4 is a sectional view of a fourth structure of the display device provided by the present disclosure.

Referring to FIG. 4, FIG. 4 is a sectional view of a fourth structure of the display device provided by the present disclosure. It should be noted that a difference between FIG. 4 and FIG. 3 is: the color conversion film 21 is disposed between the second protection film 700 and the surface protection film 800.

In the present disclosure, the color conversion film is disposed in the polarizer. When the light passes the polarizer, the cyan light and the yellow-orange light in the light are absorbed by the color conversion film in the polarizer, thus purifying the emitted light and improving the color gamut of the display device.

The present disclosure provides a color conversion film, a material thereof, and a display device. The material of the color conversion film includes the first compound and the second compound. The first compound is the boron fluoride dipyrrole derivative which may absorb the cyan light at 480 nm-510 nm, and then emit the green light, and the second compound is the rhodamine 101 derivative which may absorb the yellow-orange light at 560 nm-610 nm, and then emit the red light. The heat stability of the color conversion film is enhanced by using the color conversion film made of the material of the color conversion film. Moreover, the color gamut of the display device is improved, and the costs thereof are reduced by applying the color conversion film to the display device.

The embodiments of the present disclosure are introduced in detail above. Specific examples herein are used to set forth the principles and the implementation of the present disclosure. The illustration of the foregoing embodiments is only used to facilitate understanding the present disclosure. Moreover, for those skilled in the art, both of the specific embodiments and the application scope can still be modified in accordance with the idea of the present disclosure. In summary, the content of the specification should not be construed as the limitation to the present disclosure.

What is claimed is:

1. A material of a color conversion film, comprising: a first compound and a second compound, wherein a structural formula of the first compound is

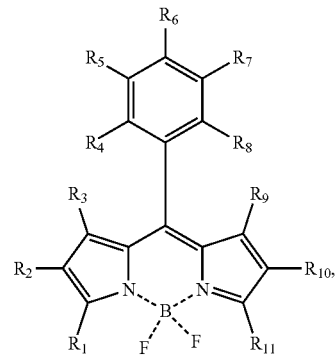

wherein $R_1$, $R_2$, $R_3$, $R_4$, $R_5$, $R_6$, $R_7$, $R_8$, $R_9$, $R_{10}$, and $R_{11}$ are respectively and independently selected from one of a halogen atom, —CN, a tert-butyl group, a non-conjugated structure, and a conjugated structure formed by connecting an alkoxy group with an ester group;

wherein a structural formula of the second compound is

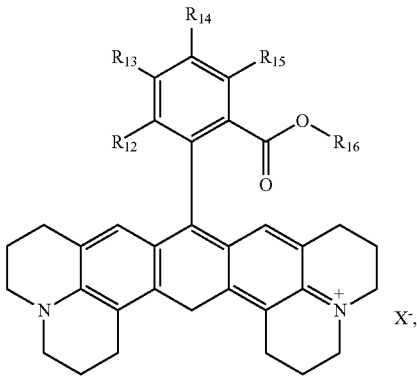

wherein $R_{12}$, $R_{13}$, $R_{14}$, and $R_{15}$ are one of —F, —Cl, Br, —I, —NH$_2$, —COOH, —OH, —SH, —COH, —COO—, —COCl, —COBr, —CN, —NO$_2$, —NH$_2$, =NH, ≡N, a benzene, a phenol ring, an non-conjugated structure, and a conjugated structure formed by connecting an alkoxy group with an ester group, $R_{16}$ is an non-conjugated structure, and $X^-$ is one of $F^-$, $Cl^-$, $Br$, $CN^-$, $ClO_4^-$, $CF_3SO_3^-$, $CF_2HSO_3^-$, and $CFH_2SO_3^-$; and wherein a mass ratio of the first compound and the second compound is (0.4-1.6):(0.3-1.7).

2. The material of the color conversion film according to claim 1, wherein the material of the color conversion film further includes a dispersion system, the first compound and the second compound are dispersed in the dispersion system, the dispersion system is a pressure sensitive adhesive, and a mass ratio of the first compound, the second compound, and the dispersion system is (0.4-1.6):(0.3-1.7):(100-1000).

3. The material of the color conversion film according to claim 1, wherein the material of the color conversion film further includes a dispersion system, the first compound and the second compound are dispersed in the dispersion system, the dispersion system includes an acrylic resin, an acrylic monomer, and a photoinitiator, and a mass ratio of the first compound, the second compound, the acrylic resin, the acrylic monomer, and the photoinitiator is (0.4-1.6):(0.3-1.7):(24-300):(74-500):(2-200).

4. The material of the color conversion film according to claim 1, wherein the non-conjugated structure is selected from one of an ester group containing a chain structure, $-C_nH_{2n+1}$, $-OC_yH_{2y+1}$, and $-FC_mH_{2m}$, and n=1-40, y=1-40, and m=1-40.

5. The material of the color conversion film according to claim 1, wherein the conjugated structure formed by the connection of the alkoxy group and the ester group further includes a heterocyclic group, and the heterocyclic group includes one of a five-membered heterocyclic group, a six-membered heterocyclic group, and a benzoheterocyclic group.

6. The material of the color conversion film according to claim 5, wherein the five-membered heterocyclic group includes one of furan, thiophene, pyrrole, imidazole, and thiazole.

7. The material of the color conversion film according to claim 5, wherein the six-membered heterocyclic group includes one of pyridine, pyrazine, pyrimidine, and pyridazine.

8. The material of the color conversion film according to claim 5, wherein the benzoheterocyclic group includes one of indole, quinoline, pteridine, and acridine.

9. A color conversion film, comprising: the material of the color conversion film according to claim 1.

10. A display device, comprising:
an optical structure including a color conversion film;
wherein a material of the color conversion film includes a first compound and a second compound;
wherein a structural formula of the first compound is

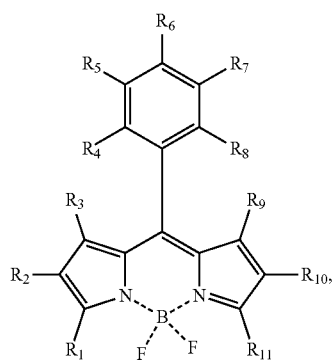

wherein $R_1$, $R_2$, $R_3$, $R_4$, $R_5$, $R_6$, $R_7$, $R_8$, $R_9$, $R_{10}$, and $R_{11}$ are respectively and independently selected from one of a halogen atom, $-CN$, a tert-butyl group, an non-conjugated structure, and a conjugated structure formed by connecting an alkoxy group with an ester group;

wherein a structural formula of the second compound is

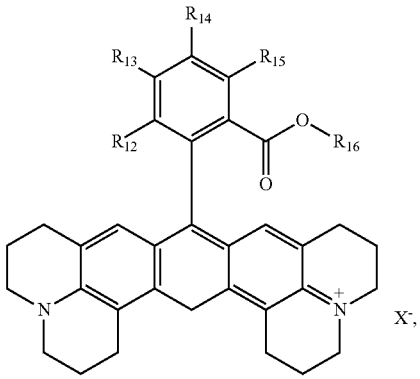

wherein $R_{12}$, $R_{13}$, $R_{14}$, and $R_{15}$ are one of $-F$, $-Cl$, $Br$, $-I$, $-NH_2$, $-COOH$, $-OH$, $-SH$, $-COH$, $-COO-$, $-COCl$, $-COBr$, $-CN$, $-NO_2$, $-NH_2$, $=NH$, $\equiv N$, a benzene, a phenol ring, an non-conjugated structure, and a conjugated structure formed by connecting an alkoxy group with an ester group, $R_{16}$ is an non-conjugated structure, and $X^-$ is one of $F^-$, $Cl^-$, $Br$, $CN^-$, $ClO_4^-$, $CF_3SO_3^-$, $CF_2HSO_3^-$, and $CFH_2SO_3^-$; and wherein a mass ratio of the first compound and the second compound is (0.4-1.6):(0.3-1.7).

11. The display device according to claim 10, wherein the display device further includes a backlight source and a back plate;
wherein the backlight source is disposed near a lateral side of the optical structure, and the back plate is disposed under a bottom of the optical structure;
wherein the optical structure is a light guiding plate, and the color conversion film is disposed at a side of the light guiding plate close to the backlight source; and
wherein the light guiding plate further includes a reflective layer, the reflective layer is disposed at a lower surface of the light guiding plate close to the back plate, and the reflective layer includes a plurality of reflective portions.

12. The display device according to claim 10, wherein the display device further includes a backlight source and a back plate;
wherein the backlight source is disposed near a lateral side of the optical structure, and the back plate is disposed under a bottom of the optical structure;
wherein the optical structure is a light guiding plate, and the color conversion film is disposed at a lower surface of the light guiding plate close to the back plate; and
wherein the light guiding plate further includes a reflective layer, the reflective layer is disposed at a lower surface of the color conversion film close to the back plate, and the reflective layer includes a plurality of reflective portions.

13. The display device according to claim 10, wherein the optical structure is a polarizer, and the color conversion film is disposed in the polarizer.

14. The display device according to claim 11, wherein the display device further includes a heat dissipation plate, and the heat dissipation plate is disposed at a side of the backlight source away from the optical structure.

15. The display device according to claim 11, wherein the display device further includes a light transmitting layer, and the light transmitting layer is disposed at a side of the color conversion film away from the light guiding plate.

16. The display device according to claim 11, wherein the display device further includes a baffle, and the baffle is located under a lower surface of the reflective layer close to the back plate.

17. The display device according to claim 16, wherein the display device further includes a barrier layer, and the barrier layer is located near a side of the backlight source away from the baffle.

18. The display device according to claim 13, wherein the polarizer includes a peeling protection film and a surface protection film, and the color conversion film is disposed between the peeling protection film and the surface protection film.

* * * * *